US011549916B2

(12) United States Patent
Brignac et al.

(10) Patent No.: US 11,549,916 B2
(45) Date of Patent: Jan. 10, 2023

(54) APPARATUS AND METHOD FOR IMPROVED CORROSION THINNING DETECTION

(71) Applicant: Westinghouse Electric Company LLC, Cranberry Township, PA (US)

(72) Inventors: Jacques Brignac, Simsbury, CT (US); George Rowland, Winsted, CT (US); Jay M. Baldwin, Woodbridge, CT (US); Glenn Hart, Suffield, CT (US); Bruce Farver, Windsor Locks, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 277 days.

(21) Appl. No.: 16/102,928

(22) Filed: Aug. 14, 2018

(65) Prior Publication Data

US 2019/0128850 A1   May 2, 2019

Related U.S. Application Data

(60) Provisional application No. 62/577,834, filed on Oct. 27, 2017.

(51) Int. Cl.
*G01N 29/22* (2006.01)
*G01N 29/04* (2006.01)
(Continued)

(52) U.S. Cl.
CPC .......... *G01N 29/226* (2013.01); *G01B 17/02* (2013.01); *G01N 17/00* (2013.01); *G01N 29/041* (2013.01);
(Continued)

(58) Field of Classification Search
CPC .. G01N 29/226; G01N 29/043; G01N 29/262; G01N 17/00; G01N 29/041;
(Continued)

(56) References Cited

U.S. PATENT DOCUMENTS 4,543,528 A * 9/1985 Baraona ............... G01N 27/904
324/262
4,955,235 A   9/1990 Metala et al.
(Continued)

FOREIGN PATENT DOCUMENTS

CN   104792871 A     7/2015
CN   105548370 A *   5/2016 ............. G01N 29/24
(Continued)

OTHER PUBLICATIONS

International Search Report and Written Opinion for International PCT Application No. PCT/US2018/046602, dated Dec. 5, 2018.
(Continued)

*Primary Examiner* — Marrit Eyassu
(74) *Attorney, Agent, or Firm* — K&L Gates LLP (57) ABSTRACT

An apparatus for performing ultrasonic evaluation of a portion of a pipe includes a frame assembly and a plurality of ultrasonic sensors disposed in the frame assembly. The frame assembly includes a frame which is structured to cooperatively engage an outer surface of the pipe. The frame has a curved surface which is curved about an axis which, when the frame is engaged with the pipe, generally coincides with the central longitudinal axis of the pipe. The curved surface is generally defined by a radius which is generally equal to an outer radius of the pipe. The plurality of ultrasonic sensors are disposed in the frame assembly a fixed distance from the curved surface.

19 Claims, 8 Drawing Sheets

(51) Int. Cl.
  *G01N 29/265* (2006.01)
  *G01N 29/28* (2006.01)
  *G01B 17/02* (2006.01)
  *G01N 29/26* (2006.01)
  *G01N 17/00* (2006.01)

(52) U.S. Cl.
  CPC ......... *G01N 29/043* (2013.01); *G01N 29/262* (2013.01); *G01N 29/265* (2013.01); *G01N 29/28* (2013.01); *G01N 2291/0258* (2013.01); *G01N 2291/0289* (2013.01); *G01N 2291/2634* (2013.01)

(58) Field of Classification Search
  CPC .............. G01N 29/265; G01N 29/28; G01N 2291/0258; G01N 2291/2634; G01N 2291/0289; G01B 17/02
  USPC ........................................................ 73/622
  See application file for complete search history.

(56) References Cited

U.S. PATENT DOCUMENTS

| | | | | |
|---|---|---|---|---|
| 5,734,588 | A * | 3/1998 | Rose | G01N 29/043 702/39 |
| 5,770,800 | A | 6/1998 | Jenkins et al. | |
| RE36,130 | E * | 3/1999 | Haynes | G01N 29/265 73/622 |
| 5,915,277 | A * | 6/1999 | Patton | G01N 29/2412 73/601 |
| 5,948,996 | A * | 9/1999 | Takeuchi | G01L 1/16 73/504.03 |
| 6,578,424 | B1 * | 6/2003 | Ziola | G01N 29/223 73/632 |
| 6,813,950 | B2 * | 11/2004 | Glascock | G01N 29/221 73/622 |
| 7,852,073 | B2 * | 12/2010 | Kwun | G01N 29/223 324/262 |
| 7,874,212 | B2 * | 1/2011 | Yamano | G01N 29/043 73/622 |
| 7,913,562 | B2 | 3/2011 | Kwun et al. | |
| 8,087,298 | B1 * | 1/2012 | DiMambro | G01N 29/226 73/629 |
| 8,166,823 | B2 | 5/2012 | Lam et al. | |
| 8,495,915 | B2 | 7/2013 | Yamano | |
| 8,590,383 | B2 | 11/2013 | Brignac et al. | |
| 9,335,302 | B2 | 5/2016 | Oberdoerfer et al. | |
| 9,726,569 | B2 | 8/2017 | Koyanagi | |
| 9,885,690 | B2 | 2/2018 | Bond-Thorley et al. | |
| 9,970,907 | B2 | 5/2018 | Ten Grotenhuis et al. | |
| 2008/0163700 | A1 * | 7/2008 | Huang | G01F 1/663 73/861.25 |
| 2009/0095087 | A1 * | 4/2009 | Yamano | G01N 29/225 73/622 |
| 2009/0114026 | A1 * | 5/2009 | Simmons | G01N 29/04 73/640 |
| 2009/0178465 | A1 * | 7/2009 | Ethridge | G01N 29/26 73/1.82 |
| 2010/0005846 | A1 * | 1/2010 | Yamano | G01N 29/265 72/31.13 |
| 2011/0072905 | A1 * | 3/2011 | Lam | G01N 29/262 73/622 |
| 2014/0352438 | A1 | 12/2014 | Scaccabarozzi et al. | |
| 2015/0219602 | A1 | 8/2015 | Bond-Thorley et al. | |
| 2015/0233869 | A1 | 8/2015 | Barrett | |
| 2016/0238564 | A1 * | 8/2016 | Owens | G01N 29/2412 |
| 2016/0282309 | A1 * | 9/2016 | Kleinert | G01N 29/22 |
| 2016/0327520 | A1 | 11/2016 | Ten Grotenhuis et al. | |
| 2016/0370303 | A1 * | 12/2016 | Schmitz | G01N 23/083 |
| 2017/0261472 | A1 | 9/2017 | Schulz | |
| 2017/0336366 | A1 | 11/2017 | Badeau et al. | |
| 2018/0164255 | A1 | 6/2018 | Conforti et al. | |
| 2018/0242066 | A1 * | 8/2018 | Buckland | B06B 1/06 |

FOREIGN PATENT DOCUMENTS

| | | |
|---|---|---|
| DE | 102014119684 A1 | 6/2016 |
| EP | 2937622 A1 | 10/2015 |
| EP | 3236255 A1 | 10/2017 |
| JP | S61159153 A | 7/1986 |
| JP | H03075557 A | 3/1991 |
| JP | 2009276085 A | 11/2009 |
| JP | 2013174531 A | 9/2013 |
| JP | 5406881 B2 | 11/2013 |
| WO | WO2012056218 A1 | 5/2012 |
| WO | WO2012154954 A2 | 11/2012 |
| WO | WO2014023938 A2 | 2/2014 |
| WO | WO2016053048 A1 | 4/2016 |
| WO | 2019083592 A1 | 5/2019 |

OTHER PUBLICATIONS

International Preliminary Report on Patentability for International PCT Application No. PCT/US2018/046602, dated Apr. 28, 2020.
Supplementary European Search Report for corresponding European Patent Application No. 18870759.0, dated Jun. 28, 2021.

* cited by examiner

APPARATUS AND METHOD FOR IMPROVED CORROSION THINNING DETECTION

CROSS-REFERENCE TO RELATED APPLICATIONS

This patent application claims the priority benefit under 35 U.S.C. § 119(e) of U.S. Provisional Application No. 62/577,834 filed on Oct. 27, 2017, the contents of which are herein incorporated by reference.

FIELD OF THE INVENTION

The present invention is directed to apparatus for performing non-destructive evaluations of portions of pipes. The present invention is further directed to frame assemblies for use in apparatus for performing non-destructive evaluations of portions of pipes.

BACKGROUND OF THE INVENTION

Pipelines, such as those used for the transmission of gases and liquids, are vulnerable to attack by internal and external corrosion, cracking, third party damage and manufacturing flaws. If a pipeline carrying water springs a leak or bursts, it can be a problem but it usually does not harm the environment. However, if a petroleum or chemical pipeline leaks or bursts, it can be an environmental disaster. If a pipeline related to a critical system fails, such as a coolant system in a nuclear reactor, an even more extreme disaster may occur. In an attempt to keep pipelines operating safely, periodic inspections are performed to find flaws and damage before they become cause for concern. Such periodic inspections may be carried out in a variety of ways. When a pipeline is built, inspection personnel may use visual, X-ray, magnetic particle, ultrasonic and other inspection methods to evaluate the welds and ensure that they are of high quality. Similar methods are also commonly employed to inspect exposed pipelines at pre-determined intervals after such pipelines have been in service.

Figure 1:
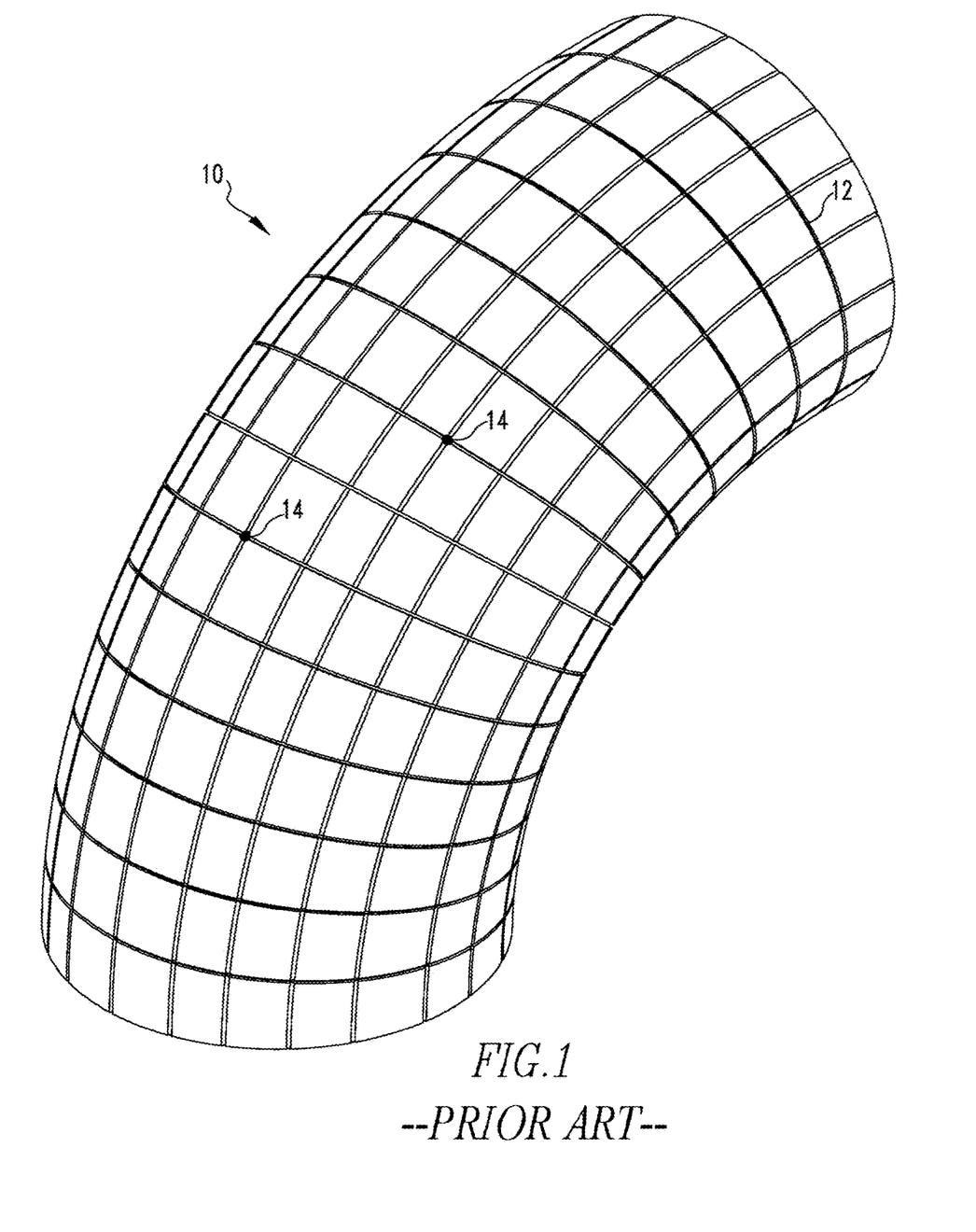
FIG. 1 shows an example of an arrangement for ultrasonic inspection of a 90° elbow in accordance with a prior art non-destructive examination technique.

Such ultrasonic inspections of piping are typically carried out using an ultrasonic sensor of circular shape about 0.250 inches in diameter which covers an area of about 0.049 in$^2$. Such sensor is typically placed at various points on a grid of predetermined spacing which is laid out by the technician prior to taking readings with the sensor. FIG. 1 shows an example of an arrangement for ultrasonic inspection of a 90° elbow 10 according to such prior art approach. In such example, a grid 12 (only a portion of which is shown in FIG. 1) was laid out (e.g., via a paint marker) on the entire surface of elbow 10 prior to taking readings at the various points 14 (only two points are labeled in FIG. 1) of grid 12 thereon. In such example, grid 12 would typically take at least two man hours to lay out on the surface of elbow 10 and placing the aforementioned sensor at all of the points on the grid and recording readings took would take at least an additional 45 minutes to record. Hence, nearly three hours or more time would be required to inspect a limited percentage of the wall of such a single 90° elbow. While such method may be effective for detecting rather large thinned areas, such method may not detect localized corrosion. Additionally, the frequency of such inspections may be limited due to the time/cost required.

Accordingly, there exists room for improvement in the apparatuses and methods for carrying out such inspections.

SUMMARY OF THE INVENTION

Embodiments of the present invention provide apparatuses and methods for performing non-destructive evaluation of piping which not only evaluate much percentages of the piping with greater resolution but can accomplish such evaluations in a much shorter time than conventional approaches.

As one aspect of the present invention, a frame assembly for use in an apparatus for performing ultrasonic evaluation of a portion of a pipe is provided. The frame assembly comprises: a frame which is structured to cooperatively engage an outer surface of the pipe, the frame having a curved surface which is curved about an axis which, when the frame is engaged with the pipe generally coincides with the central longitudinal axis of the pipe, the curved surface is generally defined by a radius which is generally equal to an outer radius of the pipe, wherein the frame is structured to house a plurality of ultrasonic sensors therein a fixed distance from the curved surface.

The frame may include a main passage defined therein such that when the plurality of sensors are housed in the frame the main passage is disposed between the plurality of ultrasonic sensors and the curved surface.

The frame assembly may further comprise a skirt formed from a flexible material extending outward from the curved surface which is disposed around and encircles an opening of the main passage defined in the curved surface, wherein, the main passage and the skirt are positioned such that when the frame assembly is disposed on an outer surface of the pipe a reservoir is formed which is generally defined on a first side by the plurality of ultrasonic sensors, on a second side opposite the first side by the outer surface of the pipe, and by the main passage and the skirt which extend between the first side and the second side.

The skirt may completely encircle the opening.

The skirt may be disposed partially in a groove defined in the curved surface.

The frame may further include a fluid supply conduit extending from a fluid supply inlet positioned on an outer surface of the frame to a fluid outlet positioned at the reservoir, and the fluid supply conduit may be structured to convey a supply of an ultrasonic conductive fluid to the reservoir.

The skirt may include a coating disposed on a surface thereof opposite the frame.

The frame may further comprise an air removal conduit which extends from an inlet in the reservoir to an outlet defined in an exterior surface of the frame.

The frame may further comprise a valve arrangement provided in the air removal conduit.

The frame assembly may further comprise an encoder device disposed within a cavity defined in the frame which is structured to track the position of the frame assembly along the pipe.

The encoder device may include an encoder wheel which is rotatable about an encoder axis, and the encoder wheel may include an outer surface which is structured to protrude from the frame through an opening defined in the frame and engage an outer surface of the pipe.

The encoder device may be pivotally mounted to the frame, and the frame may include a biasing mechanism which is engaged with the encoder device in a manner such that the outer surface of the encoder wheel is biased outward from the frame.

The biasing mechanism may be adjustably coupled to the frame such that a biasing force provided by the biasing mechanism on the encoder device may be selectively adjusted by a user of the frame assembly.

The frame may include a number of magnetic elements positioned at or about the curved surface which are structured to magnetically interact with the pipe.

Each magnetic element may be adjustably coupled to the frame via an adjustment mechanism which provides for the strength of the magnetic interaction between each magnetic element and the pipe to be adjusted by providing for the relative positioning with regard to the frame of each magnetic element to be adjusted.

The frame may comprise a number of indicia provided on an exterior surface thereof. The indicia may comprise raised bars which are positioned to indicate the positioning of the ultrasonic sensors.

The frame may include a number of chamfered sections provided adjacent the curved surface.

The frame may include a number of index buttons positioned thereon.

As another aspect of the present invention, an apparatus for performing ultrasonic evaluation of a portion of a pipe is provided. The apparatus comprises: a frame assembly as previously described; and a plurality of ultrasonic sensors disposed in the frame assembly.

The plurality of ultrasonic sensors may comprise a flexible 64 element phased array probe.

As yet another aspect of the present invention, a system for performing non-destructive evaluation of a portion of a pipe is provided. The system comprises: a processing unit; an output device in communication with the processing unit; and an apparatus as previously described, wherein the plurality of ultrasonic sensors are in communication with the processing unit.

The system may further comprise an input device in communication with the processing unit for inputting of information to the processing unit.

The input device and the output device may be provided as a single touchscreen mechanism.

As yet a further aspect of the present invention, a kit for use in performing ultrasonic evaluations of portions of different pipes of different diameters is provided. The kit comprises: a sensor array having a plurality of ultrasonic sensors; and a plurality of the frame assembly previously described, wherein the radius of the curved surface of any one frame assembly of the plurality differs from the radius of the curved surface of any other one frame assembly of the plurality, and wherein the sensor array is selectively coupleable to the frame of any of the plurality.

The plurality may comprise at least five frame assemblies.

As yet another further aspect of the present invention, a method of performing ultrasonic evaluation of a portion of a pipe using a system as previously described is provided. The method comprises: positioning the apparatus onto an outer surface of a pipe; providing a flow of ultrasonic conducting fluid to a main fluid supply inlet; and sliding the apparatus along the outer surface of the pipe in a direction parallel to the longitudinal axis of the pipe.

The method may further comprise, prior to positioning the apparatus onto the outer surface, marking the outer surface of the pipe with indicia to indicate a left and a right bound of an area which is to be scanned.

The frame may include a number of index buttons positioned thereon in communication with the processing unit, and the method may further comprise: after sliding the apparatus, repositioning the apparatus on the outer surface of the pipe in a position adjacent to where the apparatus was slid; and activating one of the index buttons.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention will now be described more fully hereinafter with reference to the accompanying drawings, in which examples of the invention are shown. The invention may, however, be embodied in many different forms and should not be construed as limited to the examples set forth herein. Rather, these examples are provided so that this disclosure will be thorough and complete, and will fully convey the scope of the invention to those skilled in the art. Like numbers refer to like elements throughout.

As used herein, the term "number" shall mean one or an integer greater than one (i.e., a plurality).

As used herein, the phrase "selectively disposed" means that the element which is "selectively disposed" may be readily removed and/or placed into the other element in which it is selectively disposed.

As previously mentioned, embodiments of the present invention provide apparatuses and methods for performing non-destructive evaluation of piping which not only evaluate much larger percentages of a given section of the piping but can accomplish such evaluations in a much shorter time than conventional approaches. Such improvements are accomplished through the use of a plurality of sensors used in conjunction with a novel, low-profile frame design which is employed in moving the sensors along the pipe in a predictable and reliable manner. Such combination allows for rapid scanning of large sections of piping as compared to conventional approaches.

Figure 2:
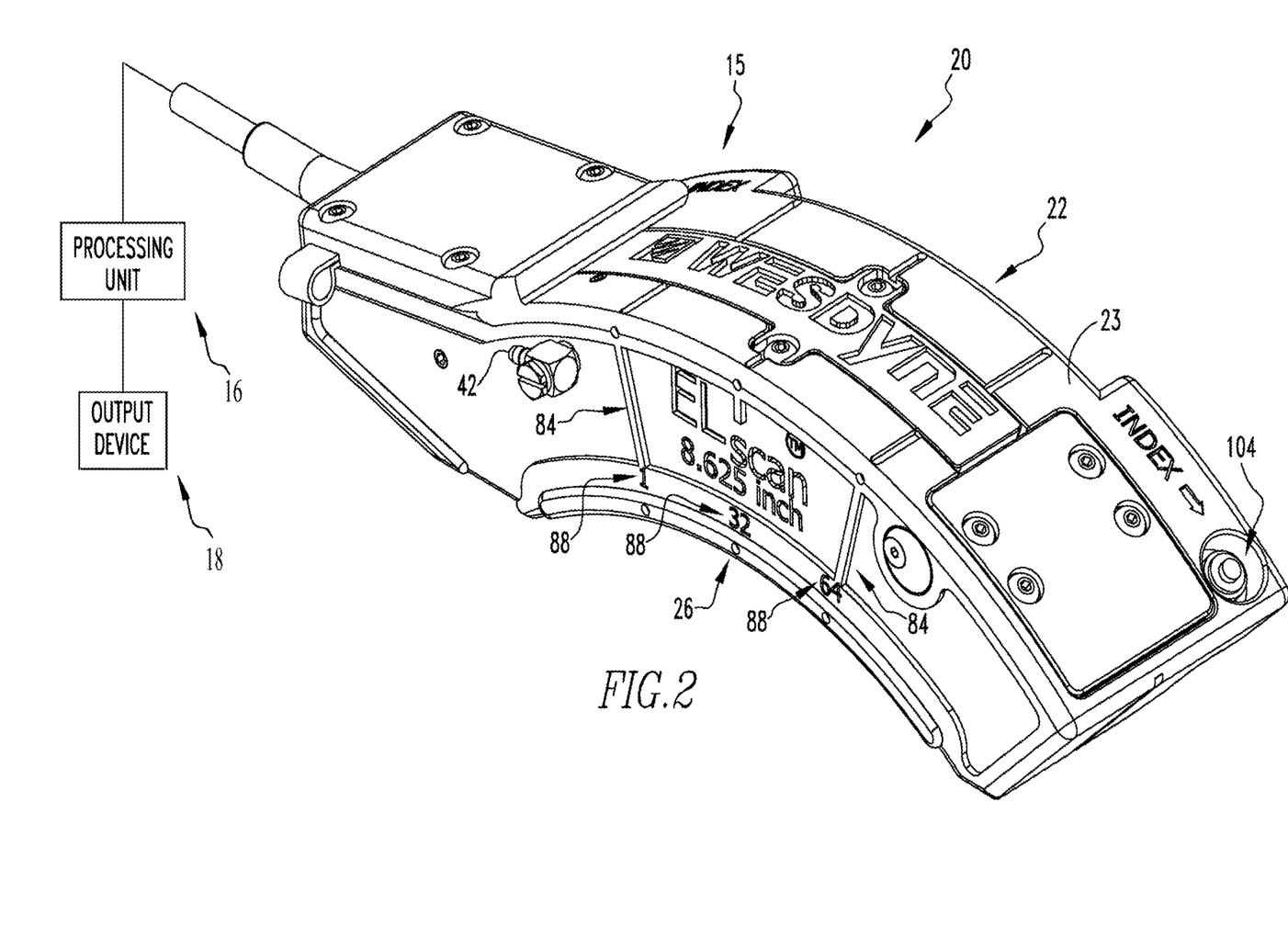
FIG. 2 is a partially schematic view of an example system for performing non-destructive evaluation of a portion of a pipe in accordance with an example embodiment of the present invention.

FIG. 2 is a partially schematic view of an example system 15 for performing non-destructive evaluation of a portion of a pipe in accordance with an example embodiment of the present invention. System 15 includes a processing unit 16 in communication with an output device 18 and an apparatus 20 for interacting with a pipe that is being inspected. System 15 may also include an input device (not shown) in communication with processing unit 16 for inputting of information to processing unit 16. Alternately, output device 18 may be in the form of a combination input/output device (e.g., without limitation, a touchscreen) for both inputting information to, and receiving information from, processing unit 16.

Processing unit 16 includes a processing portion which may be, for example, a microprocessor, a microcontroller or some other suitable processing device, and a memory portion that may be internal to the processing portion or operatively coupled to the processing portion and that provides a storage medium for data and software executable by the processing portion for controlling the operation of system 15. The memory portion can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

Output device 18 may be any suitable device for viewing output from system 15. For example, without limitation, output device 18 may be one or more of: an electronic display screen, a device producing a tangible output (e.g., a printer), or a device which communicates information received from processing unit 16 to one or more other devices (either local or remote) via any suitable communications means.

Various additional views of the example apparatus 20 are shown in FIGS. 3-7. Apparatus 20 includes a plurality of ultrasonic sensors 21 (FIG. 5), in communication (e.g., via suitable cabling, not numbered) with processing unit 16, which are selectively disposed in a frame assembly 22. Frame assembly 22 is utilized to hold ultrasonic sensors 21 a fixed distance from a pipe being inspected while providing for such sensors 21 to be moved along such pipe in a quick, predictable, repeatable fashion, while carrying out a non-destructive evaluation of such pipe. In the example embodiment described in detail herein, the plurality of ultrasonic sensors 21 are in the form of a flexible 64 element (i.e., 64 sensors) phased array probe, such as manufactured by Olympus NDT Division, however, it is to be appreciated that other suitable sensor arrangements may be employed without varying from the scope of the present invention. FIG. 8 shows a comparison of the scanning area B of such phased array probe versus the scanning area A of a point sensor such as previously described in the Background section.

Figure 3:
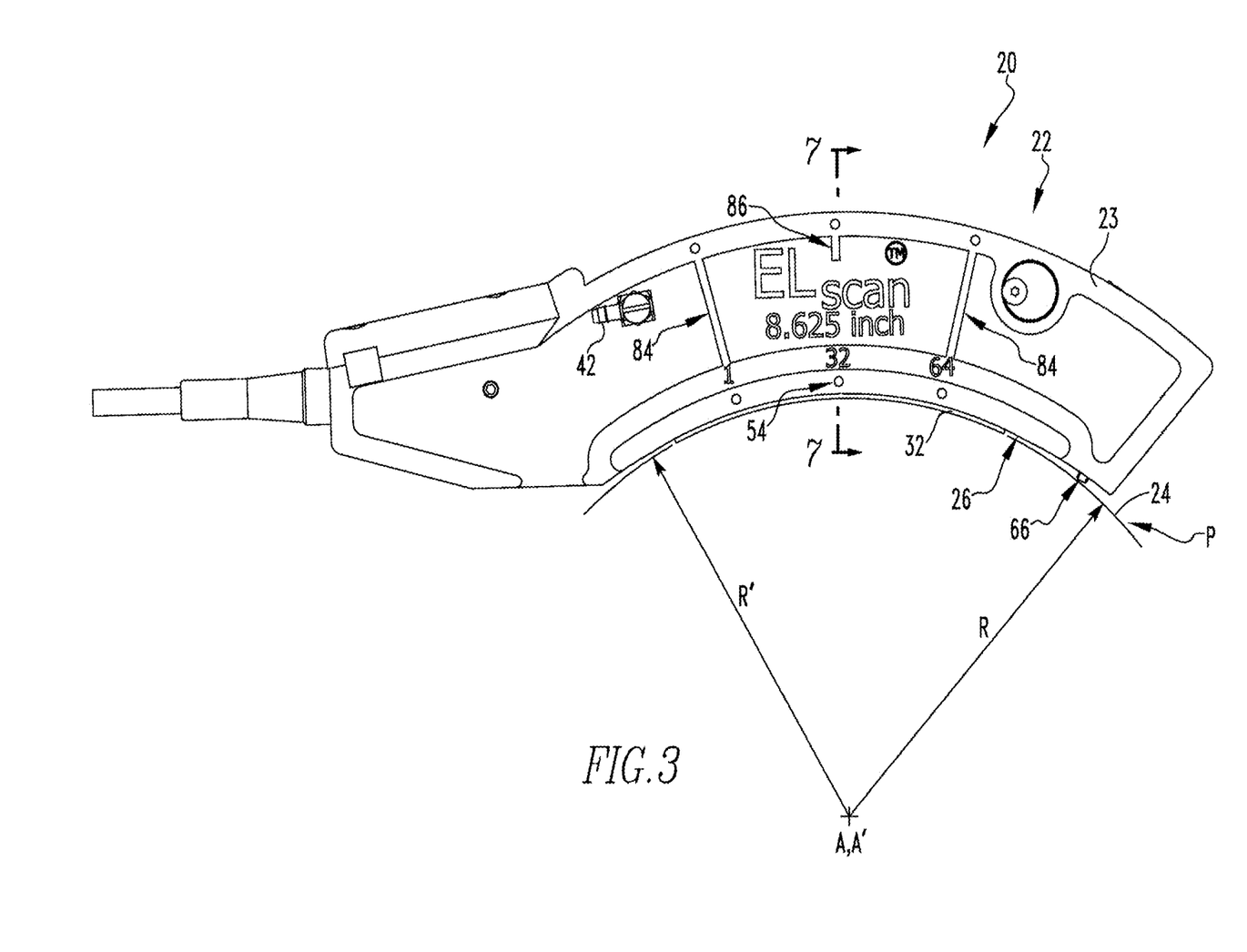
FIG. 3 shows a front elevation view of the apparatus of FIG. 2 shown disposed in a scanning position on the outer surface of a section of pipe in accordance with an example embodiment of the present invention.
Figure 4:
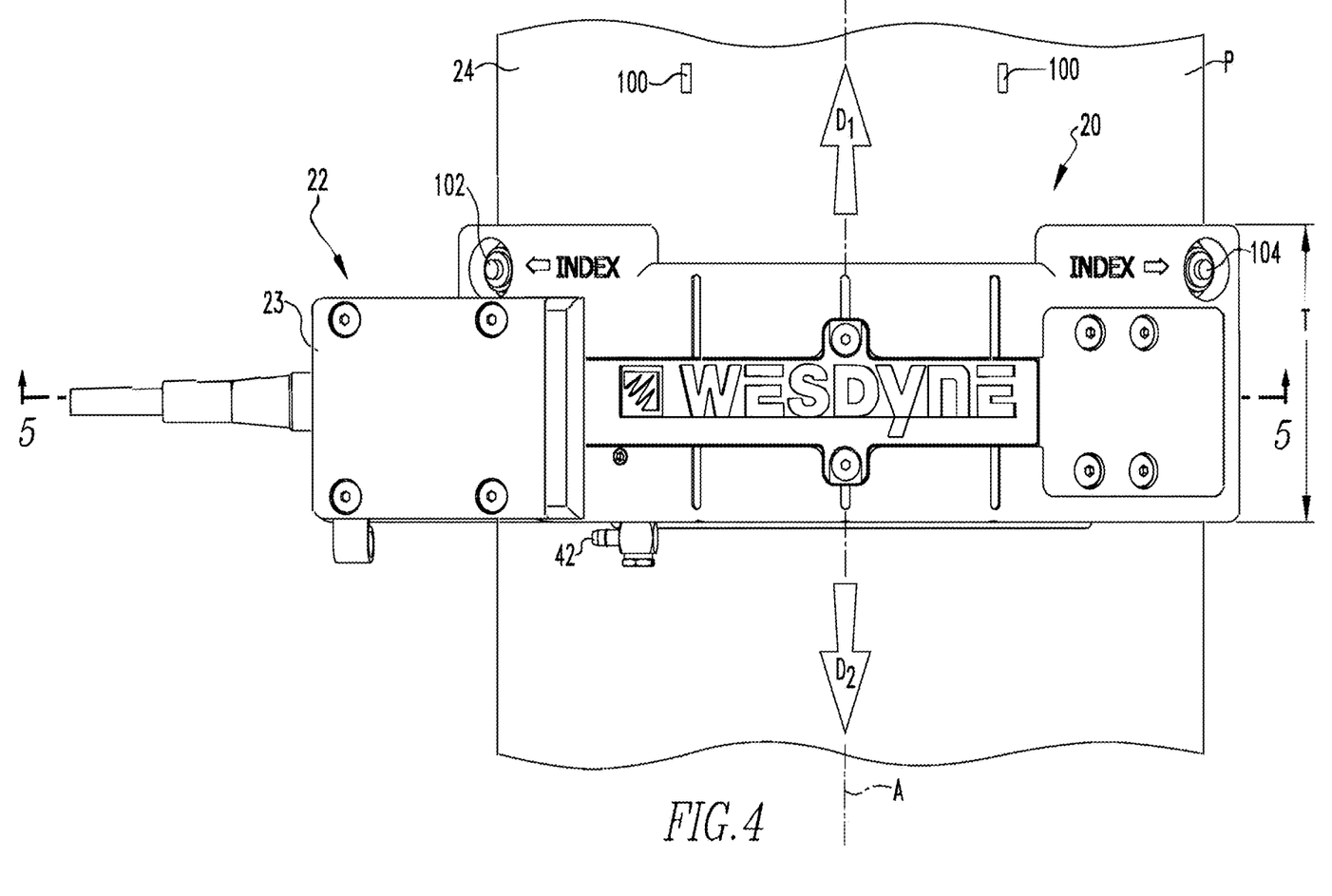
FIG. 4 shows a top view of the arrangement of FIG. 3 of the apparatus of FIG. 2 disposed on a section of pipe.

Frame assembly 22 includes a frame 23, which is structured to have a number of components disposed therein or thereon, in addition to sensors 21, as will be discussed further below. In an example embodiment of the present invention, frame 23 was constructed utilizing an additive manufacturing process from an ABS material. Is to be appreciated, however, that frame 23 may be formed via other suitable process and/or material or materials without varying from the scope of the present invention. As shown in FIGS. 3 and 4, frame 23 is structured to generally cooperatively engage an outer surface 24 of a pipe P (only a portion of which is shown) which is being evaluated/inspected, and then be slid along (i.e., in a direction parallel to the longitudinal axis A of pipe P) outer surface 24 of pipe P, such as shown by block arrows $D_1$ and $D_2$ in FIG. 4, as will be discussed in further detail below. From the view of FIG. 3, it can be readily appreciated that apparatus 20 has a generally low profile which generally allows for use in tight spaces.

In order to provide for such cooperative engagement between frame 23 and pipe P, frame 23 includes a curved surface 26 which is curved about a longitudinal axis A' which, when frame 23 is generally engaged with pipe P, generally coincides with the central longitudinal axis A of pipe P. Curved surface 26 is generally defined by a radius R' which is generally equal to an outer radius R of pipe P.

Figure 6:
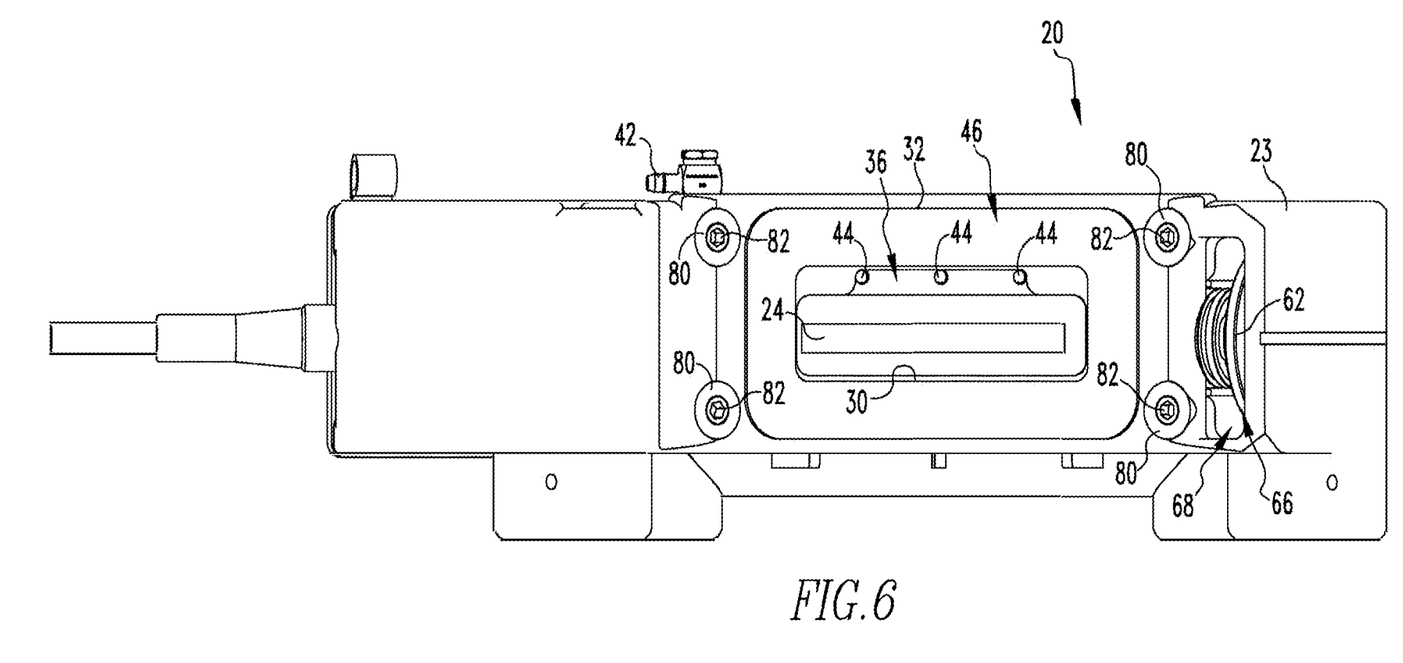
FIG. 6 shows a bottom view of the apparatus of FIG. 2.
Figure 7:
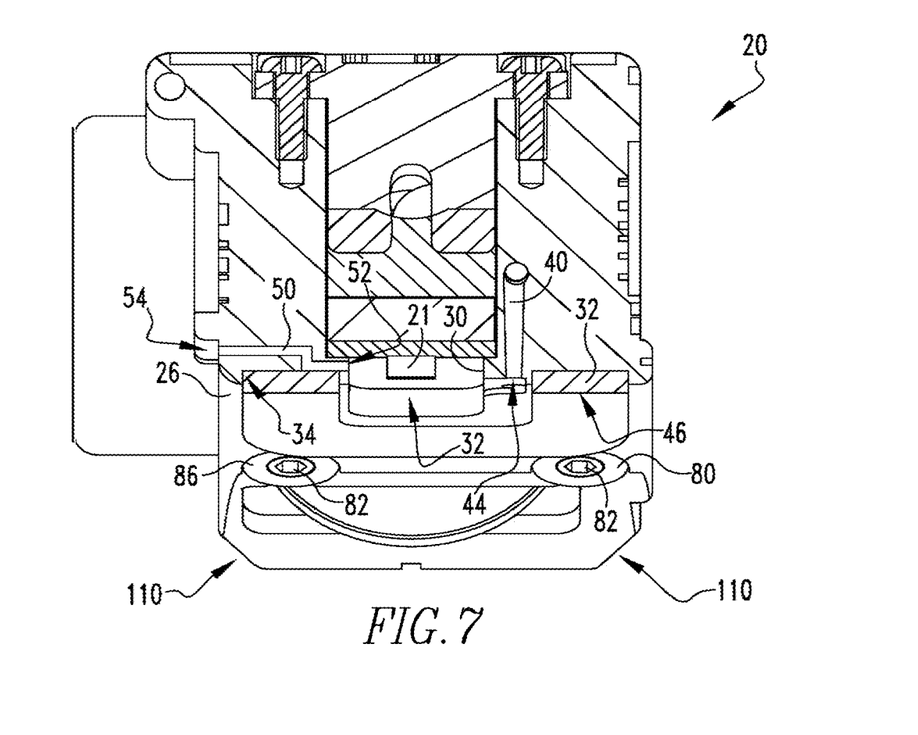
FIG. 7 shows a sectional view of the apparatus of FIG. 2 taken along line 7-7 of FIG. 3.
Figure 8:
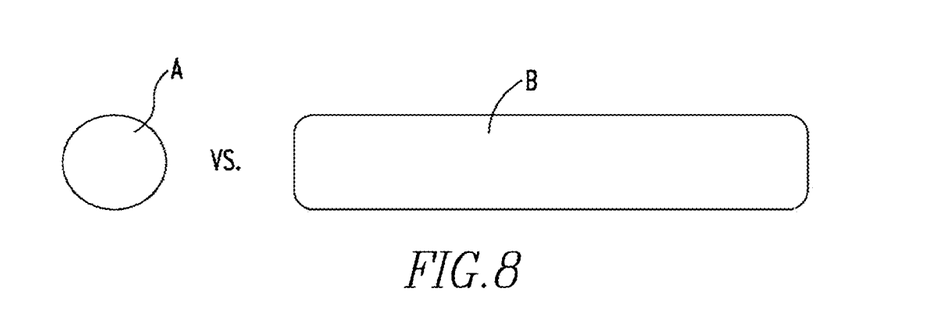
FIG. 8 shows a side-by-side comparison of the scanning area of an ultrasonic sensor used in a prior art approach to the scanning area of an ultrasonic sensor array such as employed in accordance with example embodiments of the present invention.

Referring to FIGS. 6 and 7, in order to provide for ultrasonic communication between plurality of ultrasonic sensors 21 and outer surface 24 of pipe P, a main passage 30 is defined in frame 23 between ultrasonic sensors 21 and curved surface 26. A skirt 32, formed from a flexible material (e.g., silicone sponge rubber, flexible foam, or other suitable material), extends outward from curved surface 26 and is disposed around and completely encircling the opening (not numbered) of main passage 30 in curved surface 26. In the illustrated example embodiment, skirt 32 is disposed partially in a groove 34 (FIG. 7) formed in curved surface 26, however, it is to be appreciated that other arrangements of skirt 32 may be employed without varying from the scope of the present invention. Main passage 30 and skirt 32 are positioned such that when apparatus 20 is disposed on outer surface 24 of pipe P, such as shown in FIGS. 3 and 4, a reservoir 36 is formed which is generally defined on a first side (not numbered) by ultrasonic sensors 21, on a second side (not numbered) opposite the first side by outer surface 24 of pipe P, and by main passage 30 and skirt 32 which extend between such first and second sides.

In operation, reservoir 36 is provided with a supply of a suitable ultrasonic conductive fluid (not shown, e.g., without limitation water) via a number of fluid supply conduits 40 (a portion of one is shown in FIG. 7) which extend from a main fluid supply inlet 42 positioned on an outer surface (not numbered) of frame 23 to a number of outlets 44 which open into reservoir 36. In the illustrated example embodiment, three outlets 44 defined generally in curved surface 26 within an area bounded by skirt 32 are employed (e.g., see FIG. 6), however, is to be appreciated that other quantities and/or positioning of the number of outlets 44 may be varied without varying from the scope of the present invention.

In order to provide for an improved seal between skirt 32 and outer surface 24 of pipe P and/or to reduce friction there between, a coating (not numbered) may be provided on a pipe contacting surface 46 of skirt 32. In an example embodiment of the present invention, a layer of polyethylene tape was employed, however, it is to be appreciated that other suitable material may be employed without varying from the scope of the present invention.

As shown in the sectional view of FIG. 7, in order to provide for the removal of any air which may initially be trapped in reservoir 36 or which may develop as bubbles therein during operation (and thus ensure interrupted communication between ultrasonic sensors 21 and pipe P, a number of air removal conduits 50 which extend from one or more inlets 52 in reservoir 36 to one or more outlets 54 defined in an exterior surface of frame 23. Such conduits 50 may also be provided with a suitable check valve arrangement which allows for such pathways to selectively be opened or closed as desired by a user of apparatus 20.

Figure 5:
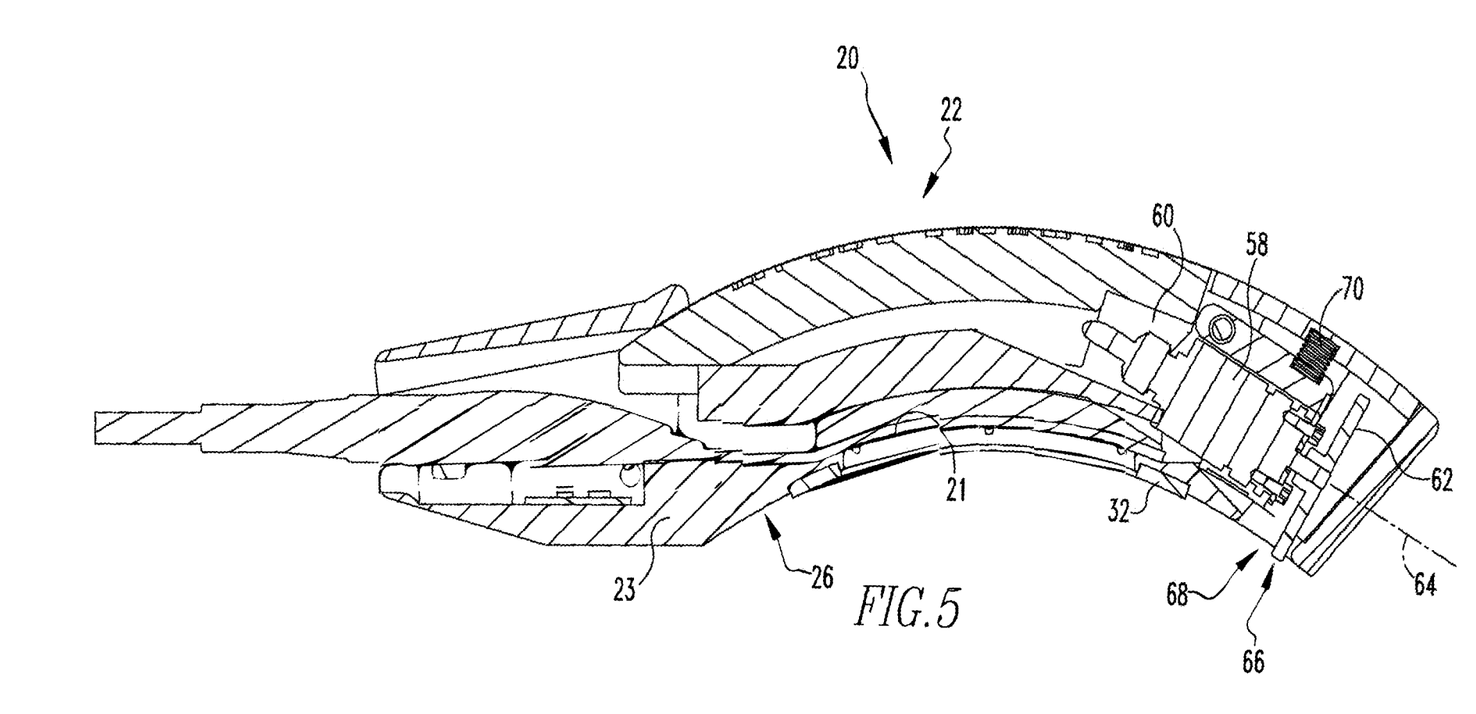
FIG. 5 shows a sectional view of the apparatus of FIG. 2 taken along line 5-5 of FIG. 4.

Referring now to the sectional view of FIG. 5, in order to track the position of apparatus 20 along pipe P and to provide for repeatability in subsequent evaluations, frame assembly 22 further includes an encoder device 58 disposed within a cavity 60 defined in frame 23. Encoder device 58 is electrically connected to processing unit 16 via suitable cabling (not numbered). As commonly constructed, encoder device 58 includes an encoder wheel 62 which is rotatable about an encoder axis 64. Encoder wheel 62 includes an outer surface 66 which, as shown in FIG. 3, is structured to slightly protrude from frame 23 through an opening or slot 68 defined in frame 23 and engage outer surface 24 of pipe P. In order to help ensure consistent engagement of outer surface 66 of encoder wheel 62 with outer surface 24 of pipe P, encoder device 58 may be pivotally mounted to frame 23 and a biasing mechanism, such as a spring 70, or other suitable mechanism, may be provided on or in frame 23 which biases outer surface 66 of encoder wheel 62 generally toward outer surface 24 of pipe P. Such biasing mechanism may be adjustably coupled to frame 23 such that the biasing force provided by such mechanism on encoder device 58, and thus to outer surface 66 of encoder wheel 62 thereof, may be selectively adjusted by a user of apparatus 20. Although shown disposed generally at or near an end of frame 23, it is to be appreciated that encoder device 58 may be positioned in other locations with respect to frame 23. Additionally, although shown utilizing encoder wheel 62, it is to be appreciated that encoder device 58 may utilize any suitable arrangement for tracking the positioning of frame 23 without varying from the scope of the present invention.

In order to ensure consistent engagement of frame assembly 22 with outer surface 24 of pipe P, frame 23 may include a number (four are included in the illustrated example embodiment) of magnetic elements 80 positioned at or about curved surface 26 (e.g., provided on or in recesses formed in curved surface 26). In an example embodiment of the present invention, axial ring magnets with poles on the flats ends thereof were employed as magnetic elements 80, however, it is to be appreciated that other suitable magnets or magnetic structures may be employed without varying from the scope of the present invention. Each magnetic element 80 may be adjustably coupled to frame 23 via a suitable adjustment mechanism, e.g., without limitation and Alan head screw 82, which allows for the relative positioning of each magnetic element 80 in regard to pipe P to be adjusted and thus the strength of the magnetic attraction between each element 80 and pipe P to be selectively adjusted. It is to be appreciated that the inclusion of such magnetic elements 80 not only ensures consistent engagement between apparatus 20 and outer surface 24 of pipe P but can also provide for apparatus 20 two remain magnetically attached to pipe P thus allowing a technician the use of both hands when needed without losing track of the location of where apparatus 20 was on pipe P.

In order for the user to readily identify the location of the plurality of ultrasonic sensors 21 within apparatus 20, frame 23 may be provided with a number of indicia formed as an integral portion thereof or as an element added thereto. In the illustrated example embodiment frame 23 includes indicia in the form of raised bars 84 which indicate the opposing ends of ultrasonic array 21, as well as a shorter central bar 86 which indicates the center of ultrasonic array 21. Is also shown in the illustrated example embodiment such indicia may also be in the form of alphanumeric characters, such as the numerals 88 which provide indicators of the positioning as well as identifying number of some of the plurality of ultrasonic sensors 21.

Having thus described the basic components of apparatus 20 (i.e., the plurality of ultrasonic sensors 21 and frame assembly 22 and components thereof), the basic operation of apparatus 20 will now be described in conjunction with FIGS. 3, 4 and 9. As an initial step before using apparatus 20 to inspect a pipe, outer surface 24 of pipe P is preferably marked with indicia 100 to indicate the left and right bounds of the area which is to be scanned. Typically, the positioning of such indicia 100 is determined by dividing the circumference of pipe P into a plurality of spacings equal to the width of the area covered by the plurality of ultrasonic sensors 21. After such indicia 100 are provided, apparatus 20 is placed onto outer surface 24 of pipe P, a flow of ultrasonic conducting fluid is provided to main fluid supply inlet 42 (e.g., such as via a suitable pump providing liquid from a reservoir or other supply), and apparatus 20 is then slid on outer surface 24 of pipe P in a direction parallel to the longitudinal axis A of pipe P (such as shown by either of block arrows $D_1$ or $D_2$ of FIG. 4) until a desired length of pipe P has been scanned.

Figure 9:
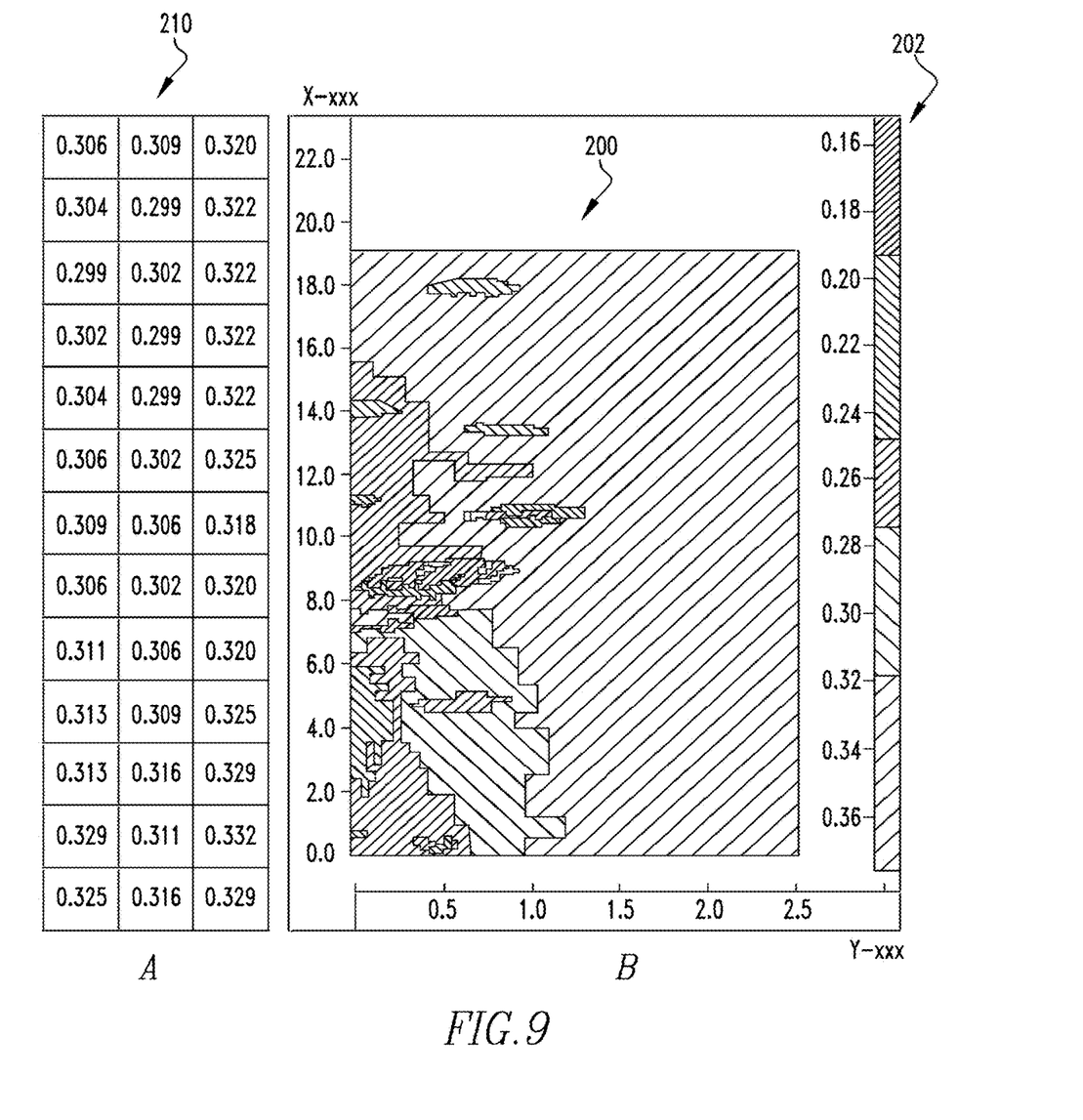
FIG. 9 shows a side-by-side comparison of the results of measurements taken on a portion of a section of pipe obtained from the prior art approach as discussed in conjunction with FIG. 1 and a schematic representation of the results obtained from an example embodiment of the present invention.

Part B of FIG. 9 shows an partially schematic example of the graphical output 200 (such as provided on output unit 18 of FIG. 2) of the data (approximately 8000 data points) obtained in one of such passes made by apparatus 20 in a matter of a few seconds. In the example shown in FIG. 9, each of the different hashes represent different colors (e.g., red, orange, yellow, green, blue, etc.) which correspond to different thicknesses, such as shown in the scale 202. In a preferred embodiment, a continuous blend of colors (similar to a rainbow, e.g., red transitions to orange which transitions yellow then to green, etc., as opposed to sharp cut-offs) is utilized to better show transitions in thicknesses. It is thus to be appreciated that output 200 thus generally resembles a weather radar map but instead of showing different storm intensities with differing colors different thicknesses are shown.

In contrast to the example output 200 provided by an embodiment of the present invention, Part A of FIG. 9 shows data 210 (39 data points) obtained by a method such as described in the Background section of this application for a similar section of pipe which required approximately 45 minutes to obtain. From such comparison, it is to be readily appreciated that the present invention provides quicker results which are of much greater resolution and provide a readily readable result of variations in wall thickness of pipe P.

In order to provide for subsequent adjacent passes to be readily made by apparatus 20, frame assembly 23 may include one or more index buttons electrically connected to processing unit 16 which allow for user of apparatus 22 readily indicate the positioning of a subsequent pass after completing a given pass. In the illustrated example embodiment, frame assembly 23 includes a left index button 102 and a right index button 104, each being positioned generally near an end of apparatus 20 so as to be readily activated by either a left-hand or a right-hand, respectively, of the user. In operation, upon completing a scanning pass with apparatus 20, a user would activate the appropriate index button to indicate that the next scanning pass they are making is either to the right of the just completed pass (and thus would activate button 104) or to the left of the just completed pass (and thus would activate button 102). When activated, each of buttons 102 and 104 provide a signal to processing unit 16 which is recognized by processing unit 16 is an indication of the respective column in which data from the scan about to be received is to be placed in the output relative to the data from the previous scan.

From the foregoing, it is to be readily appreciated that embodiments of the present invention provide for a section of piping to be ultrasonically scanned faster, in greater detail, and with more readily readable results than prior solutions. It is also to be readily appreciated that embodiments of the present invention may be readily utilized in inspecting both straight portions of pipe as well as curved sections. In order to accommodate the intrados of a curved section, the thickness T, such as shown in FIG. 4, may be minimized so as to ensure that skirt 32 does not become disengaged from outer surface 24 of pipe P during a scanning pass. Additionally or alternatively depending on the application, frame 23 may be provided with one or more chamfered sections, such as chamfered sections 110 shown in FIG. 7, which provide for better fitment of frame 23 on the intrados portion of a curved section of pipe.

In order to provide cost-effective solution for inspecting pipes of different diameters, the plurality of ultrasonic sensors 21 may readily be removed from a first apparatus 20 having a frame assembly 22 with a frame 23 sized to fit a pipe having a first diameter, and placed into a second apparatus 20 having a frame assembly 22 with a friend 23 which is sized to fit another pipe having a second diameter which is different than the first diameter. Accordingly, embodiments of the present invention be provided as kit which includes a single sensor array having the plurality of ultrasonic sensors 21 along with a plurality (e.g., without limitation, five) of frame assemblies 22, each having a frame 23 which is sized to fit a different diameter pipe. Hence, the user of such kit could selectively place the single sensor array in the frame assembly 22 having the frame 23 which is sized to fit the pipe which is to be inspected.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A system for use in performing ultrasonic evaluations of portions of different pipes of different diameters, the system comprising:
   a flexible phased array probe; and
   a plurality of frame assemblies, wherein each frame assembly comprises a frame structured to engage an outer surface of a pipe of the different pipes, wherein the frame comprises a curved surface which is curved about an axis which, when the frame is engaged with the pipe of the different pipes, coincides with a central longitudinal axis of the pipe of the different pipes, wherein the curved surface is defined by a radius which is generally equal to an outer radius of the pipe of the different pipes, wherein the frame is structured to releasably hold the flexible phased array probe therein a fixed distance from the curved surface, wherein the frame is configured to force the flexible phased array probe into a shape based on the flexible phased array probe being releasably inserted into the frame, wherein the frame is configured to force the flexible phased array probe into the shape without the flexible phased array probe engaging the outer surface of the pipe of the different pipes, and wherein the shape is substantially the same as the outer surface of the pipe of the different pipes;
   wherein a radius of a curved surface of any one frame assembly of the plurality of frame assemblies differs from a radius of a curved surface of any other one frame assembly of the plurality of frame assemblies, and
   wherein the flexible phased array probe is selectively coupleable to each frame of the plurality of frame assemblies.

2. The system of claim 1, wherein each frame includes a main passage defined therein such that when the flexible phased array probe is releasably held in the frame, the main passage is disposed between the flexible phased array probe and the curved surface.

3. The system of claim 2, wherein each frame further comprises a skirt formed from a flexible material extending outward from the curved surface which is disposed around and encircles an opening of the main passage defined in the curved surface,
   wherein, the main passage and the skirt are positioned such that when the frame assembly is disposed on an outer surface of the pipe of the different pipes, a reservoir is formed which is generally defined on a first side by the flexible phased array probe, on a second side opposite the first side by the outer surface of the pipe of the different pipes, and by the main passage and the skirt which extend between the first side and the second side.

4. The system of claim 3, wherein each frame further includes a fluid supply conduit extending from a fluid supply inlet positioned on an outer surface of the frame to a fluid outlet positioned at the reservoir, and wherein the fluid supply conduit is structured to convey a supply of an ultrasonic conductive fluid to the reservoir.

5. The system of claim 3, wherein the skirt includes a coating disposed on a surface thereof opposite the frame.

6. The system of claim 3, wherein each frame further comprises an air removal conduit which extends from an inlet in the reservoir to an outlet defined in an exterior surface of the frame.

7. The system of claim 3, wherein each frame further comprises an encoder device disposed within a cavity defined in the frame which is structured to track a position of the frame assembly along the pipe of the different pipes.

8. The system of claim 7, wherein the encoder device includes an encoder wheel which is rotatable about an encoder axis, and wherein the encoder wheel includes an outer surface which is structured to protrude from the frame through an opening defined in the frame and engage an outer surface of the pipe of the different pipes.

9. The system of claim 8, wherein the encoder device is pivotally mounted to the frame, and wherein the frame includes a biasing mechanism which is engaged with the encoder device in a manner such that the outer surface of the encoder wheel is biased outward from the frame.

10. The system of claim 3, wherein each frame includes a number of magnetic elements positioned at or about the curved surface which are structured to magnetically interact with the pipe.

11. The system of claim 3, wherein each frame includes a number of index buttons positioned thereon.

12. The system of claim 1, wherein the flexible phased array probe comprises a flexible 64-element phased array probe.

13. A system for performing non-destructive evaluation of a portion of a pipe, the system comprising:
   a processing unit;
   an output device in communication with the processing unit; and
   the system of claim 1, wherein the flexible phased array probe is in communication with the processing unit.

14. The system of claim 13, further comprising an input device in communication with the processing unit for inputting of information to the processing unit.

15. The system of claim 14, wherein the input device and the output device are provided as a single touchscreen mechanism.

16. A method of performing ultrasonic evaluation of a portion of a pipe using the system of claim 13, the method comprising:
   positioning a frame assembly releasably holding the flexible phased array probe onto an outer surface of a pipe;
   providing a flow of ultrasonic conducting fluid to a main fluid supply inlet; and
   sliding the frame assembly releasably holding the flexible phased array probe along the outer surface of the pipe in a direction parallel to the longitudinal axis of the pipe.

17. The method of claim 16, further comprising, prior to positioning the frame assembly releasably holding the flexible phased array probe onto the outer surface, marking the outer surface of the pipe with indicia to indicate a left and a right bound of an area which is to be scanned.

18. The method of claim 17, wherein the frame assembly releasably holding the flexible phased array probe includes a number of index buttons positioned thereon in communication with the processing unit, and wherein the method further comprises:
   after sliding the frame assembly releasably holding the flexible phased array probe, repositioning the frame assembly releasably holding the flexible phased array probe on the outer surface of the pipe in a position adjacent to where the frame assembly releasably holding the flexible phased array probe was slid; and
   activating one of the index buttons.

19. A system for performing ultrasonic evaluations of portions of pipes, the system comprising:
   a plurality of frame assemblies, comprising:
      a first frame assembly comprising a first curved surface with a first radius of curvature, wherein the first frame assembly is configured to abut an outer surface of a first pipe, wherein the first curved surface corresponds to the outer surface of the first pipe; and
      a second frame assembly comprising a second curved surface with a second radius of curvature that is different than the first radius of curvature, wherein the second frame assembly is configured to abut an outer surface of a second pipe, wherein the second curved surface corresponds to the outer surface of the second pipe; and
   a flexible phased array probe selectively insertable into the first frame assembly and the second frame assembly, wherein the first frame assembly is configured to force a surface of the flexible phased array probe to conform with the first curved surface of the first frame assembly, based on the flexible phased array probe being selectively inserted into the first frame assembly, and wherein the second frame assembly is configured to force the surface of the flexible phased array probe to conform with the second curved surface of the second frame assembly, based on the flexible phased array probe being releasably inserted into the second frame assembly.

\* \* \* \* \*